United States Patent
Oh et al.

(10) Patent No.: US 10,790,541 B2
(45) Date of Patent: Sep. 29, 2020

(54) COMPOSITION FOR GEL POLYMER ELECTROLYTE AND LITHIUM SECONDARY BATTERY COMPRISING THE GEL POLYMER ELECTROLYTE FORMED THEREFROM

(71) Applicant: LG Chem, Ltd., Seoul (KR)

(72) Inventors: Jeong Woo Oh, Daejeon (KR); Kyoung Ho Ahn, Daejeon (KR); Chul Haeng Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 151 days.

(21) Appl. No.: 16/042,074

(22) Filed: Jul. 23, 2018

(65) Prior Publication Data

US 2019/0036162 A1    Jan. 31, 2019

(30) Foreign Application Priority Data

Jul. 28, 2017 (KR) .................. 10-2017-0096441
Jul. 20, 2018 (KR) .................. 10-2018-0084809

(51) Int. Cl.
| | | |
|---|---|---|
| *H01M 10/0565* | (2010.01) | |
| *H01M 10/052* | (2010.01) | |
| *H01M 4/485* | (2010.01) | |
| *H01M 4/525* | (2010.01) | |
| *H01M 10/44* | (2006.01) | |
| *H01M 4/505* | (2010.01) | |

(Continued)

(52) U.S. Cl.
CPC ..... *H01M 10/0565* (2013.01); *C08F 299/024* (2013.01); *C08G 18/5096* (2013.01); *C08G 18/673* (2013.01); *C08G 18/755* (2013.01); *C08G 18/7614* (2013.01); *C08K 3/16* (2013.01); *C08K 5/0025* (2013.01); *C08K 5/524* (2013.01); *C08K 5/5419* (2013.01); *H01M 4/485* (2013.01); *H01M 4/505* (2013.01); *H01M 4/525* (2013.01); *H01M 10/052* (2013.01); *H01M 10/0525* (2013.01); *H01M 10/44* (2013.01); *C08G 2220/00* (2013.01); *H01M 2300/0082* (2013.01); *H01M 2300/0085* (2013.01); *H01M 2300/0091* (2013.01)

(58) Field of Classification Search
CPC ..... H01M 10/0565; H01M 2300/0091; H01M 2300/0085; H01M 2300/0082; H01M 10/0525; H01M 10/052; H01M 4/485; H01M 4/525; H01M 10/44; H01M 4/505; C08F 299/024; C08K 3/16; C08K 5/524; C08K 5/0025; C08K 5/5419; C08G 2220/00; C08G 18/673; C08G 18/7614; C08G 18/755; C08G 18/5096
USPC .......................................................... 429/300
See application file for complete search history.

(56) References Cited

FOREIGN PATENT DOCUMENTS

| | | | |
|---|---|---|---|
| JP | 4156420 B2 | * | 9/2008 |
| JP | 4156420 B2 | | 9/2008 |
| KR | 10-2014-0133219 A | | 11/2014 |

* cited by examiner

*Primary Examiner* — Gary D Harris
(74) *Attorney, Agent, or Firm* — Morgan, Lewis & Bockius LLP

(57) ABSTRACT

The present invention relates to a composition for a gel polymer electrolyte, in which liquid injection characteristics at room temperature and in an oxygen atmosphere are improved by including a non-fluoride oxygen scavenger as well as a polymerizable oligomer having a polymerizable substituent, and a lithium secondary battery in which capacity retention with cycles is excellent by including a gel polymer electrolyte which is formed by using the composition.

18 Claims, 7 Drawing Sheets

(51) Int. Cl.
*C08F 299/02* (2006.01)
*C08G 18/67* (2006.01)
*C08G 18/76* (2006.01)
*H01M 10/0525* (2010.01)
*C08K 3/16* (2006.01)
*C08K 5/524* (2006.01)
*C08G 18/75* (2006.01)
*C08K 5/00* (2006.01)
*C08K 5/5419* (2006.01)
*C08G 18/50* (2006.01)

COMPOSITION FOR GEL POLYMER ELECTROLYTE AND LITHIUM SECONDARY BATTERY COMPRISING THE GEL POLYMER ELECTROLYTE FORMED THEREFROM

CROSS-REFERENCE TO RELATED APPLICATIONS

This application claims the priority of Korean Patent Application Nos. 2017-0096441 filed on Jul. 28, 2017, and 2018-0084809 filed on Jul. 20, 2018, in the Korean Intellectual Property Office, the disclosure of which is incorporated herein by reference.

BACKGROUND OF THE INVENTION

Field of the Invention

The present invention relates to a composition for a gel polymer electrolyte, in which liquid injection characteristics are improved by controlling gelation reactivity, and a lithium secondary battery including a gel polymer electrolyte formed therefrom.

Description of the Related Art

Recently, there is a growing demand for high performance, high stability secondary batteries as electric, electronic, communication, and computer industries have rapidly developed. Particularly, in line with miniaturization and lightweight trends of electronic and communication devices, thin-film and miniaturized lithium secondary batteries, as core components in this field, are required.

Lithium secondary batteries may be divided into a lithium ion battery using a liquid electrolyte and a lithium polymer battery using a polymer electrolyte depending on the electrolyte used.

With respect to the lithium ion battery, it may have high capacity, but, since the liquid electrolyte containing a lithium salt is used, there may be a risk of leakage and explosion and battery design may be complicated to prepare for the risk.

With respect to the lithium polymer battery, since a solid polymer electrolyte or a gel polymer electrolyte containing an electrolyte solution is used as the electrolyte, stability is improved and, simultaneously, flexibility is obtained, and thus, the lithium polymer battery may be developed in various forms, for example, in the form of small or thin-film batteries. In particular, in a case in which the gel polymer electrolyte is used, since the gel polymer electrolyte may act as a separator, the number of components used in the preparation of the lithium secondary battery may be reduced, and thus, a cost-saving effect may also be expected.

The secondary battery, in which the gel polymer electrolyte is used, may be prepared by the following two methods.

First, a composition, in which a polymerization initiator and a polymerizable monomer or oligomer are mixed in a liquid electrolyte solution in which an electrolyte salt is dissolved in a non-aqueous organic solvent, is injected into a battery including an electrode assembly, in which a positive electrode, a negative electrode, and a separator are wound or stacked, and the battery may then be prepared by gelation (crosslinking) under appropriate temperature and time conditions.

However, with respect to the above method, since a process for maintaining the temperature required for the gelation is required, the method may cause time and economic losses. Also, since pre-gelation sometimes occurs at room temperature before the injection of the composition into the battery depending on compositions of the polymerization initiator and the polymerizable monomer or oligomer, performance of the liquid injection process is not only easy, but wetting of the battery is also reduced, and thus, overall performance of the battery may be reduced.

As another method, after one surface of one of an electrode and a separator is coated with a composition, in which a polymerization initiator and a polymerizable monomer or oligomer are mixed in a liquid electrolyte solution in which an electrolyte salt is dissolved in a non-aqueous organic solvent, and is cured (gelated) using heat or ultraviolet (UV) light, the electrode and/or separator having a gel polymer electrolyte formed thereon are wound or stacked to prepare an electrode assembly, and the battery may be prepared by inserting the electrode assembly into a battery case and then re-injecting the existing liquid electrolyte solution.

However, even with respect to the above method, a process of using heat or UV light for the gelation is required, and the gel-coated separator may absorb moisture to reduce performance and stability of the battery. Furthermore, since a polyethylene separator, which has been used as a conventional separator, has high heat-shrinkage rate, a short circuit occurs between the positive electrode and the negative electrode when the temperature increases under abnormal use conditions, and thus, there is a limitation in the stability of the battery.

Therefore, there is a need to develop a method capable of preparing a secondary battery in which a gel polymer electrolyte having improved overall performance, for example, a reduction in interfacial resistance and an improvement in capacity retention with cycles, is used.

SUMMARY OF THE INVENTION

An aspect of the present invention provides a composition for a gel polymer electrolyte in which liquid injection characteristics are improved by controlling gelation reactivity at room temperature and in an oxygen atmosphere.

Another aspect of the present invention provides a gel polymer electrolyte which is prepared by polymerizing the composition for a gel polymer electrolyte.

Another aspect of the present invention provides a lithium secondary battery in which overall performance, such as capacity retention with cycles, is improved because wetting is improved by including the gel polymer electrolyte.

According to an aspect of the present invention, there is provided a composition for a gel polymer electrolyte which includes:
an electrolyte salt,
an organic solvent,
an oligomer represented by the following Formula 1,
a non-fluoride oxygen scavenger, and
a polymerization initiator.

[Formula 1]

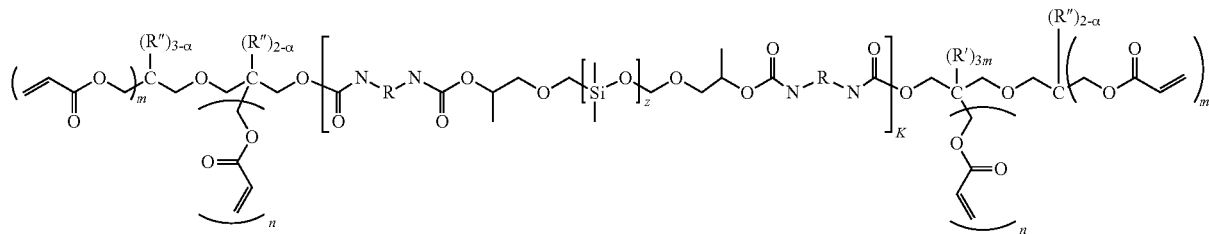

In Formula 1,

R is an aliphatic hydrocarbon group or an aromatic hydrocarbon group,

R' and R" are each independently hydrogen or an alkyl group having 1 to 3 carbon atoms, n is an integer of 1 or 2, m, z, and K are the numbers of repeating units, m is an integer of 1 to 3, z is an integer of 1 to 10,000, and K is an integer of 1 to 100.

In the oligomer represented by Formula 1, the aliphatic hydrocarbon group may include at least one selected from the group consisting of an alicyclic hydrocarbon group and a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Also, in the oligomer represented by Formula 1, the aromatic hydrocarbon group may include at least one selected from the group consisting of a substituted or unsubstituted arylene group having 6 to 20 carbon atoms; and a substituted or unsubstituted heteroarylene group having 4 to 20 carbon atoms.

The oligomer represented by Formula 1 may include at least one selected from the group consisting of compounds represented by Formulae 1a to 1c.

[Formula 1a]

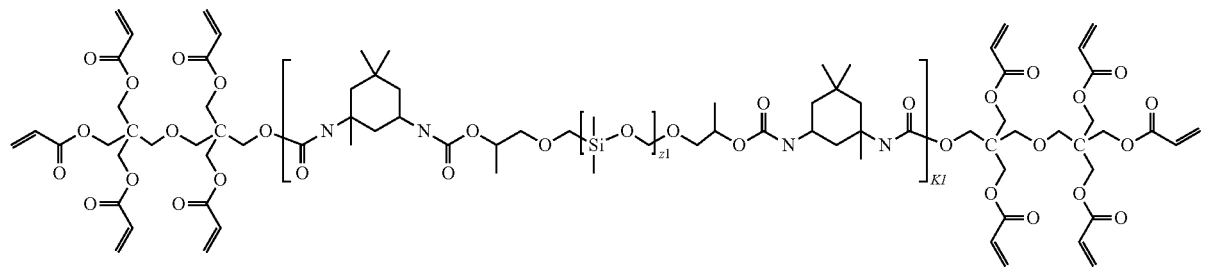

In Formula 1a, z1 and K1 are the numbers of repeating units, z1 is an integer of 1 to 10,000, and K1 is an integer of 1 to 100.

[Formula 1b]

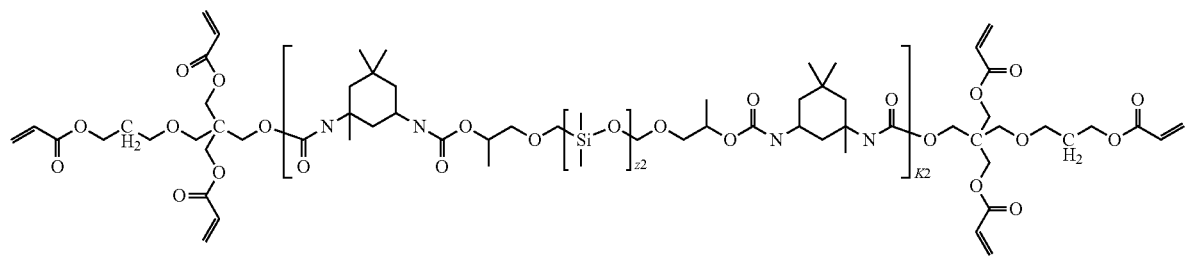

In Formula 1b,
z2 and K2 are the numbers of repeating units,
z2 is an integer of 1 to 10,000, and
K2 is an integer of 1 to 100.

[Formula 1c]

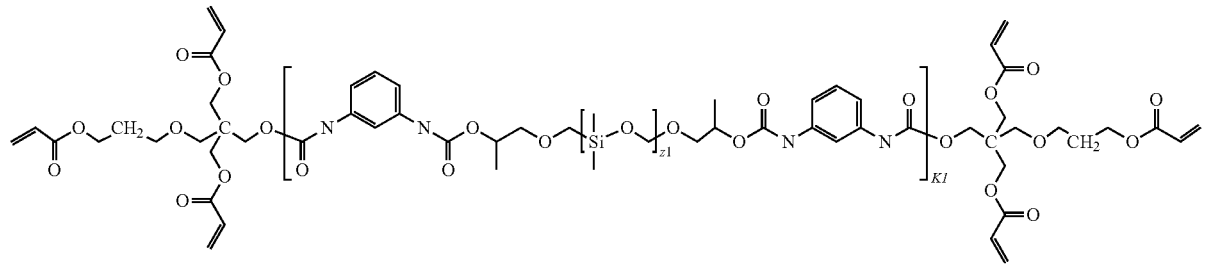

In Formula 1c,
z3 and K3 are the numbers of repeating units,
z3 is an integer of 1 to 10,000, and
K3 is an integer of 1 to 100.

The oligomer represented by Formula 1 may be included in an amount of 0.5 wt % to 25 wt % based on a total weight of the composition for a gel polymer electrolyte.

Also, in the composition for a gel polymer electrolyte of the present invention, the non-fluoride oxygen scavenger may include at least one of a trisalkylsilylphosphite-based compound and a trisarylsilylphosphite-based compound, and a representative example thereof may be at least one selected from the group consisting of tris(methylsilyl) phosphite (TMSPi), tris(ethylsilyl) phosphite (TESPi), tris(propylsilyl) phosphite (TPSPi), tris (butylsilyl) phosphite, and trisphenylsilyl phosphite.

The non-fluoride oxygen scavenger may be included in an amount of 0.5 wt % to 15 wt % based on the total weight of the composition for a gel polymer electrolyte.

Also, the polymerization initiator may be included in an amount of 0.01 part by weight to 20 parts by weight based on 100 parts by weight of the oligomer represented by Formula 1.

The composition for a gel polymer electrolyte of the present invention may further include a multifunctional (meth)acrylate-based compound having at least one acrylate group in the molecule, as a polymerizable monomer.

According to another aspect of the present invention, there is provided a lithium secondary battery including:
a positive electrode, a negative electrode, and
a gel polymer electrolyte disposed between the positive electrode and the negative electrode,
wherein the gel polymer electrolyte is formed by polymerization of the composition for a gel polymer electrolyte of the present invention.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

DETAILED DESCRIPTION OF THE PREFERRED EMBODIMENT

Figure 1:
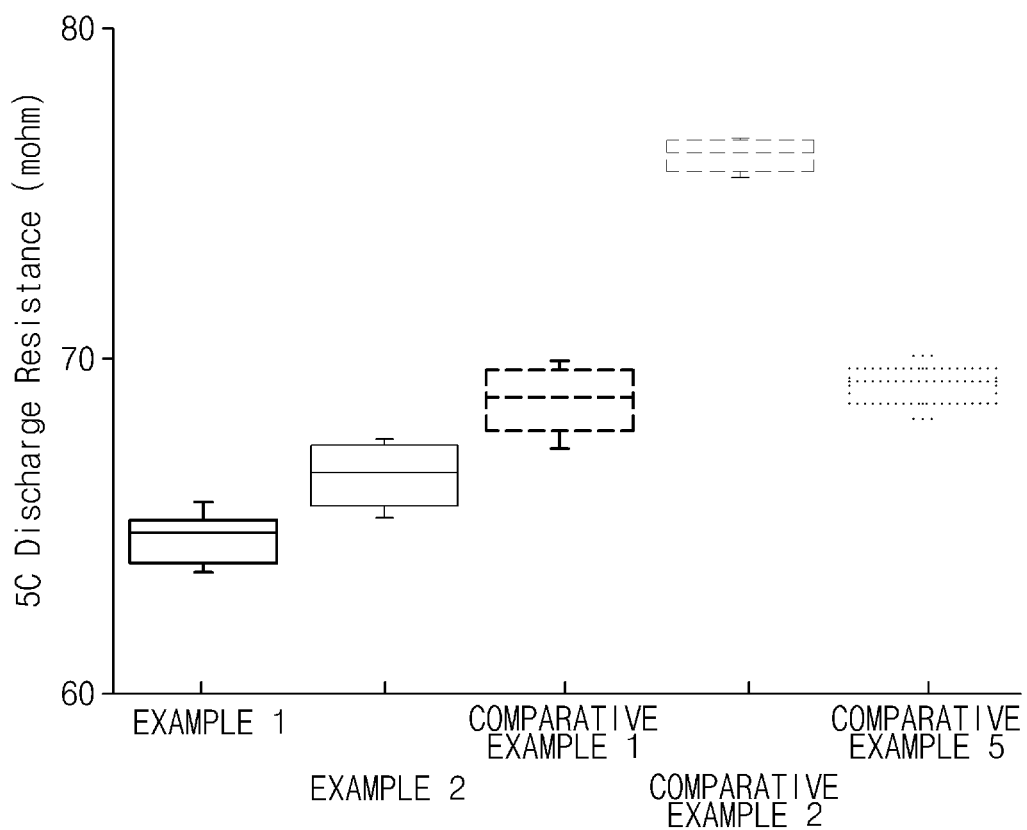
FIGS. 1 and 2 are graphs showing results of resistance and voltage drop measurements of secondary batteries in Experimental Example 3 of the present invention.

Hereinafter, preferred embodiments of the present invention will be described in more detail. In this case, it will be understood that words or terms used in the specification and claims shall not be interpreted as the meaning defined in commonly used dictionaries, and it will be further understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, —$CH_2$—, —$CH_2CH_2$—, —$CH_2CH_2CH_2$—, —$CH_2(CH_2)CH$—, —$CH(CH_2)CH_2$—, and —$CH(CH_2)CH_2CH_2$—.

Also, in the present specification, the expression "alkylene group" denotes a branched or unbranched aliphatic hydrocarbon group or a functional group in the form in which one hydrogen atom is removed from a carbon atom located at both ends of the aliphatic hydrocarbon group. In an embodiment, the alkylene group may be substituted or unsubstituted. The alkylene group includes a methylene group, an ethylene group, a propylene group, an isopropylene group, a butylene group, an isobutylene group, a tert-butylene group, a pentylene group, and 3-pentylene group, but the alkylene group is not limited thereto, and, in another embodiment, each of them may be selectively substituted.

Furthermore, unless otherwise defined in the specification, the expression "substitution" denotes that at least one hydrogen bonded to carbon is substituted with an element other than hydrogen, for example, an alkyl group having 1 to 5 carbon atoms or a fluorine element.

Also, it will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Unless otherwise defined in the specification, the expression "molecular weight" denotes a weight-average molecular weight (Mw), and a weight-average molecular weight (Mw) of a polymer or oligomer of the present invention may be measured using gel permeation chromatography (GPC) unless defined otherwise. For example, a sample having a predetermined concentration is prepared, and Alliance 4, a GPC measurement system, is then stabilized. When the system is stabilized, a standard sample and the sample are injected into the system to obtain a chromatogram, and a molecular weight may then be calculated using an analytical method (system: Alliance 4, Column: Ultrahydrogel linear× 2, eluent: 0.1M $NaNO_3$ (pH 7.0 phosphate buffer, flow rate: 0.1 mL/min, temp: 40° C., injection: 100 μL)).

In general, a secondary battery, in which a gel polymer electrolyte is used, is prepared by injecting a composition for a gel polymer electrolyte, which is prepared by mixing a polymerization initiator with a polymerizable monomer and/or oligomer, into a battery case accommodating an electrode assembly and then gelating the composition. Oxygen is a decisive factor in reducing a conversion rate of the monomer and/or oligomer into a gel during the gelation. That is, since a radical generated from the polymerization initiator is consumed by easily reacting with the oxygen, radical polymerization reactivity is reduced in the presence of oxygen. Furthermore, in a case in which oxygen is not present, a pre-gel reaction of the composition for a gel polymer electrolyte may be caused by a radical which is formed while the polymerization initiator is initiated by itself before the composition for a gel polymer electrolyte sufficiently wets an electrode. Also, with respect to the unreacted oligomer, since polymerization occurs even by electrons ($e^-$), resistance may be increased by electrodeposition on a surface of the electrode while a polymerization reaction of the oligomer occurs at a negative electrode side during charge and discharge.

Thus, in the present invention, provided are a composition for a gel polymer electrode, in which liquid injection characteristics are improved by controlling gelation reactivity at room temperature and in an oxygen atmosphere, and a lithium secondary battery in which overall performance, for example, a reduction in interfacial resistance, suppression of gas generation, and capacity retention with cycles, is improved because wetting of the battery is improved by including a gel polymer electrolyte formed therefrom.

Specifically, in an embodiment of the present invention, provided is a composition for a gel polymer electrolyte which includes:

an electrolyte salt, an organic solvent, an oligomer represented by the following Formula 1, a non-fluoride oxygen scavenger, and a polymerization initiator.

[Formula 1]

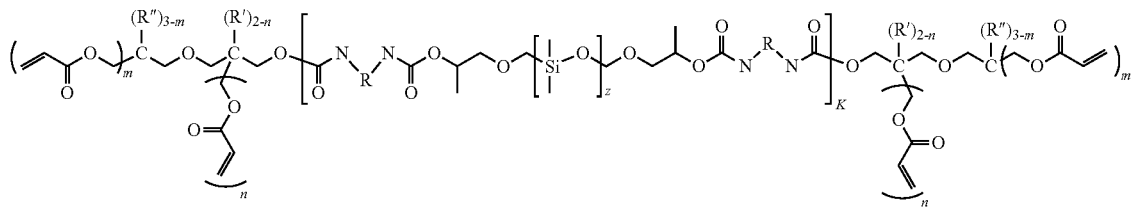

In Formula 1,

R is an aliphatic hydrocarbon group or an aromatic hydrocarbon group,

R' and R" are each independently hydrogen or an alkyl group having 1 to 3 carbon atoms, n is an integer of 1 or 2, m, z, and K are the numbers of repeating units, m is an integer of 1 to 3, z is an integer of 1 to 10,000, particularly 1 to 1,000, and more particularly 1 to 500, and K is an integer of 1 to 100, particularly 1 to 50, and more particularly 1 to 30.

In the composition for a gel polymer electrolyte according to the embodiment of the present invention, the lithium salt may include $Li^+$ as a cation, and may include at least one selected from the group consisting of $Br^-$, $I^-$, $NO_3^-$, $N(CN)_2^-$, $ClO_4^-$, $BF_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF(CF_3)_6P^-$, $CF_3SO_3^-$, $C_4F_9SO_3^-$, $CF_3CF_2SO_3^-$, $(CF_3SO_2)_2N^-$, $(SO_2)_2N^-$, $CF_3CF_2$ $(CF_3)_2CO^-$, $(CF_3SO_2)_2$ $H^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

One or, if necessary, a mixture of two or more thereof may be used as the lithium salt. The lithium salt may be appropriately changed in a normally usable range, but may specifically be included in a concentration of 0.01 M to 5 M, particularly 0.1 M to 5 M, and more particularly 0.1 M to 3 M in the composition for a gel polymer electrolyte to obtain an optimum effect of forming an anti-corrosion film on the surface of the electrode.

Also, in the composition for a gel polymer electrolyte of the present invention, the organic solvent is not limited as long as it may minimize decomposition due to an oxidation reaction during charge and discharge of the secondary battery and may exhibit desired characteristics with an additive. For example, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

The cyclic carbonate-based compound well dissociates the lithium salt in the electrolyte due to high permittivity as a highly viscous organic solvent. Thus, a non-aqueous electrolyte solution having high electrical conductivity may be prepared when the above cyclic carbonate-based compound is mixed with linear carbonate-based compound having the low viscosity, low permittivity, such as dimethyl carbonate and diethyl carbonate, and the linear ester-based compound in an appropriate ratio.

Furthermore, in the gel polymer electrolyte of the present invention, the aliphatic hydrocarbon group in the oligomer represented by Formula 1 may include at least one selected from the group consisting of an alicyclic hydrocarbon group and a linear hydrocarbon group.

The alicyclic hydrocarbon group may include at least one selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms.

The linear hydrocarbon group may include at least one selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

Also, in the oligomer represented by Formula 1, the aromatic hydrocarbon group may include at least one selected from the group consisting of a substituted or unsubstituted arylene group having 6 to 20 carbon atoms; and a substituted or unsubstituted heteroarylene group having 4 to 20 carbon atoms.

The oligomer represented by Formula 1 is a compound having a crosslinkable substituent capable of forming a polymer matrix, a basic skeleton of the gel polymer electrolyte, while being oxidized by the polymerization reaction when the temperature increases, wherein the oligomer represented by Formula 1 may include at least one selected from the group consisting of compounds represented by Formulae 1a to 1c.

[Formula 1a]

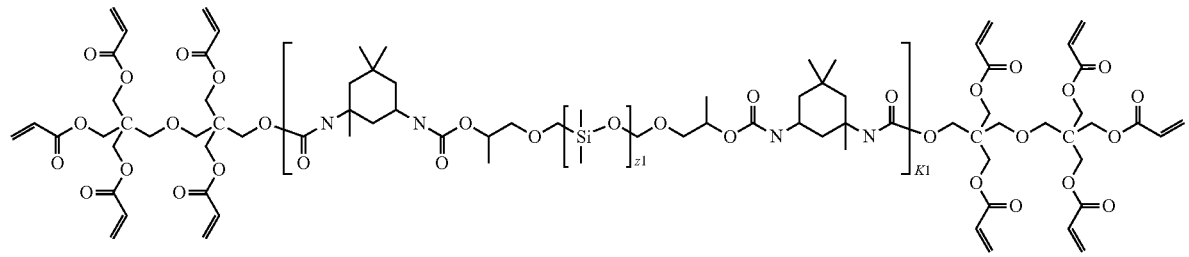

In Formula 1a,
z1 and K1 are the numbers of repeating units,
z1 is an integer of 1 to 10,000, particularly 1 to 1,000, and more particularly 1 to 500, and
K1 is an integer of 1 to 100, particularly 1 to 50, and more particularly 1 to 30.

[Formula 1b]

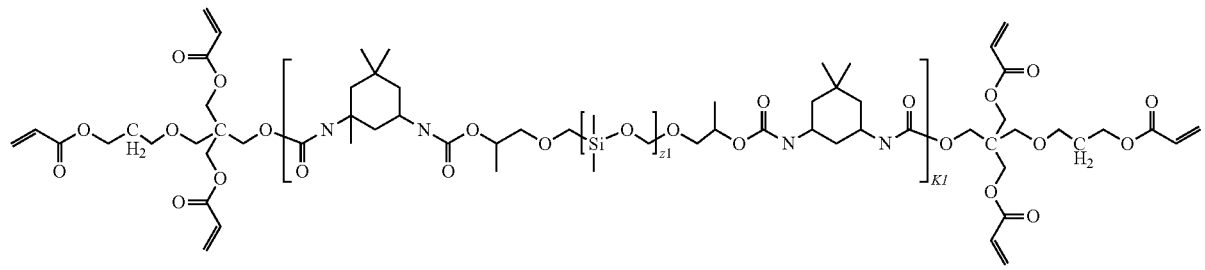

In Formula 1b, z2 and K2 are the numbers of repeating units, z2 is an integer of 1 to 10,000, particularly 1 to 1,000, and more particularly 1 to 500, and K2 is an integer of 1 to 100, particularly 1 to 50, and more particularly 1 to 30.

[Formula 1c]

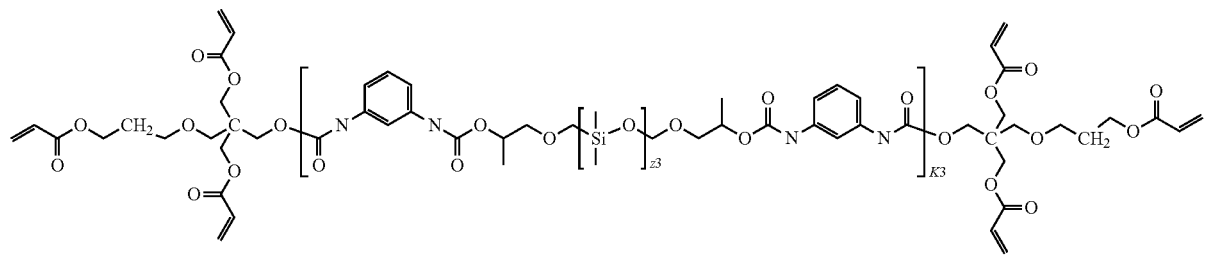

In Formula 1c, z3 and K3 are the numbers of repeating units, z3 is an integer of 1 to 10,000, particularly 1 to 1,000, and more particularly 1 to 500, and K3 is an integer of 1 to 100, particularly 1 to 50, and more particularly 1 to 30.

In this case, the oligomer may be included in an amount of 0.5 wt % to 25 wt %, particularly 0.5 wt % to 20 wt %, and more particularly 0.5 wt % to 15 wt % based on a total weight of the composition for a gel polymer electrolyte.

If the amount of the oligomer represented by Formula 1 included is within the above range, i.e., 0.5 wt % to 25 wt %, since a polymer network having excellent mechanical strength may be formed, a secondary battery having improved overall performance may be prepared. Specifically, if the amount of the oligomer is 0.5 wt % or more, the polymer matrix may be easily formed by the oligomer and physical properties, such as mechanical strength, of the gel polymer electrolyte may be secured. Also, if the amount of the oligomer is 25 wt % or less, since appropriate viscosity may be secured, wetting of the gel polymer electrolyte may be improved and the pre-gel reaction may be prevented. Furthermore, ionic conductivity may be secured to improve cycle life characteristics.

In this case, a weight-average molecular weight (Mw) of the oligomer represented by Formula 1 may be in a range of 1,000 g/mol to 20,000 g/mol, for example, 1,000 g/mol to 10,000 g/mol.

In a case in which the weight-average molecular weight (Mw) of the oligomer is within the above range, a gel polymer electrolyte having improved mechanical properties, processability (moldability), and battery safety may be prepared. In this case, the weight-average molecular weight may be measured using gel permeation chromatography (GPC). For example, a sample having a predetermined concentration is prepared, and a GPC measurement device is then stabilized. When the device is stabilized, a standard sample and the sample are injected into the device to obtain a chromatogram, and a molecular weight is then calculated using an analytical method (GPC measurement conditions: Column: PL mixed Bx2, Solvent: THF (0.45 μm filtered), Flow rate: 1.0 ml/min, Injection amount: 100 μl, Column temperature: 40° C., Detector: Agilent RI detector, Standard: PS).

Since a conventional oligomer is electrochemically unstable, it is disadvantageous in that a polymerization reaction may be caused by electrons ($e^-$) even during charge and discharge in addition to a radical reaction. The polymerization reaction caused by electrons may limit gel polymer activation process conditions (e.g., formation process may not be performed before curing (gelation)), and, particularly, a reaction may occur in which a side reaction product is electrodeposited while the oligomer is decomposed on a surface of a negative electrode due to a reaction of an acrylate group at the negative electrode side during initial charge. Since this interferes with a solid electrolyte interface (SEI) formation reaction, lithium (Li) deintercalation/intercalation reactions may be interrupted during cycling or metal dissolution may occur.

In contrast, with respect to the oligomer used in the present invention, since both of an acrylate group, as a hydrophilic part, and a siloxane group, as a hydrophobic part, are present in the structure, the oligomer may act as a surfactant in the battery to improve the wetting and an improvement in cell performance may be expected because the oligomer may exhibit a relatively balanced affinity for the hydrophilic part (positive electrode and separator (SRS layer)) and the hydrophobic part (negative electrode and separator fabric).

It is describable that the oligomer of the present invention includes a siloxane group (—[Si—O]—) and a urethane group, as repeating units of the main chain, and the oligomer does not further include a —Si— group as well as the siloxane group in the structure. That is, since the oligomer does not include an additional —Si— group as a repeating unit in the oligomer structure, a ratio of functional groups at both ends may be increased and a molecular weight of the whole polymer may be reduced, and thus, assuming that the same amount is added to the electrolyte, the amount of the total oligomer relative to an oligomer further including a —Si— group in the structure (for example, —[Si—O]—Si— structure is included as the main-chain repeat unit) may be increased. Therefore, since a reaction rate of the gel polymer may be advantageously controlled and hardness of the entire battery may be increased by increasing hardness of the gel polymer, it may be more advantageous in safety evaluation with physical impact, for example, impact evaluation.

It is known that, when the radical reaction required during the preparation of the gel polymer electrolyte is performed in the presence of oxygen, chain polymerization efficiency is reduced while the reaction is stabilized by quenching due to the oxygen.

Since the composition for a gel polymer electrolyte of the present invention includes the non-fluoride oxygen scavenger, influence of oxygen is reduced even in a case in which the gelation is performed in an oxygen atmosphere, and thus, a polymerization effect may be increased.

The non-fluoride oxygen scavenger may include at least one of a trisalkylsilylphosphite-based compound and a trisarylsilylphosphite-based compound. That is, since the trisalkylsilylphosphite-based compound or trisarylsilylphosphite-based compound included as the non-fluoride oxygen scavenger scavenges oxygen while a phosphite structure is converted into a phosphate structure, the trisalkylsilylphosphite-based compound or trisarylsilylphosphite-based compound may prevent a radical generated from the polymerization initiator from being removed by the oxygen. As described above, in the present invention, since the non-fluoride oxygen scavenger is included in the composition for a gel polymer electrolyte, reactivity of the polymerizable monomers may be increased.

A representative example of the non-fluoride oxygen scavenger may be at least one selected from the group consisting of tris(methylsilyl) phosphite (TMSPi), tris(ethylsilyl) phosphite (TESPi), tris(propylsilyl) phosphite (TPSPi), tris (butylsilyl) phosphite, and trisphenylsilyl phosphite, and, in this case, it is desirable that the use of a fluorine-based oxygen scavenger is avoided.

That is, with respect to a conventional fluorine-based oxygen scavenger which has been used as an additive for oxygen removal, for example, tris-2,2,2-trifluoroethyl phosphite (TFEPi), since it contains a fluorine element having high electrical conductivity, it has high ability to remove oxygen ($O_2$), and thus, a composition for a gel polymer electrolyte including the same is disadvantageous in that a pre-gel reaction occurs at room temperature.

Since the composition for a gel polymer electrolyte of the present invention uses the non-fluoride oxygen scavenger with low oxygen ($O_2$) removal ability due to the absence of a fluorine element, for example, the trisalkylsilylphosphite-based compound or trisarylsilylphosphite-based compound, instead of the conventional fluoride-based oxygen scavenger, it is advantageous in that the pre-gel reaction does not occur even at room temperature. Since the trisalkylsilylphosphite-based compound or trisarylsilylphosphite-based oxygen scavenger easily removes oxygen when exposed to high temperatures, an effect of increasing the gelation reactivity may be obtained by activating free radicals. Furthermore, since the non-fluoride oxygen scavenger stabilizes anions of the salt by acting as a Lewis acid in the electrolyte solution, it may prevent discoloration of the electrolyte solution due to the decomposition of the anions even if the electrolyte solution is left standing for a long time at a high temperature, and thus, an effect of maintaining a stable state of the electrolyte solution for a long period of time may be obtained.

The non-fluoride oxygen scavenger may be included in an amount of 0.5 wt % to 15 wt %, particularly 0.5 wt % to 10 wt %, and more particularly 0.5 wt % to 7 wt % based on the total weight of the composition for a gel polymer electrolyte.

If the amount of the non-fluoride oxygen scavenger included is within the range of 0.5 wt % to 15 wt %, it may suppress a pre-gelation phenomenon by controlling a polymerization conversion rate at room temperature and in the presence of oxygen. Specifically, in a case in which the amount of the non-fluoride oxygen scavenger is 0.5 wt % or more, since an oxygen scavenging effect is excellent, the polymerization conversion rate may be increased, and thus, the mechanical strength of the gel polymer electrolyte may be improved. Also, in a case in which the amount of the non-fluoride oxygen scavenger is 15 wt % or less, an increase in resistance due to a residual additive may be prevented.

Furthermore, in the present invention, the gel polymer electrolyte of the present invention may be prepared from the composition for a gel polymer electrolyte by using a conventionally known polymerization method.

A typical polymerization initiator known in the art may be used as the polymerization initiator used for the above reaction. For example, the polymerization initiator may be decomposed by heat to form a radical and may form a gel polymer electrolyte by reacting with the oligomer represented by Formula 1 by free radical polymerization.

Specifically, non-limiting examples of the polymerization initiator may be organic peroxides or hydroperoxides, such as benzoyl peroxide, acetyl peroxide, dilauryl peroxide, di-tert-butyl peroxide, t-butyl peroxy-2-ethyl-hexanoate, cumyl hydroperoxide, and hydrogen peroxide, and at least one azo compound selected from the group consisting of 2,2'-azobis(2-cyanobutane), 2,2'-azobis(methylbutyronitrile), 2,2'-azobis(iso-butyronitrile) (AIBN), and 2,2'-azobis (dimethylvaleronitrile) (AMVN), but the present invention is not limited thereto.

The polymerization initiator may be dissociated by heat in the battery, for a non-limiting example, at a temperature of 30° C. to 100° C. or may be dissociated at room temperature (5° C. to 30° C.) to form a radical, and a polymerizable oligomer may be reacted with an acrylate-based compound by free radical polymerization to form a gel polymer electrolyte.

Also, the polymerization initiator may be included in an amount of 0.01 part by weight to 20 parts by weight, for example, 0.1 part by weight to 10 parts by weight based on 100 parts by weight of the oligomer represented by Formula 1.

In a case in which the amount of the polymerization initiator included is within the range of 0.01 part by weight to 20 parts by weight, gel polymer electrolyte characteristics may be secured by increasing a gel polymer conversion rate, and wetting of the electrolyte solution to the electrode may be improved by preventing the pre-gel reaction.

Furthermore, the composition for a gel polymer electrolyte of the present invention may further include a multifunctional (meth)acrylate-based compound having at least one acrylate group in the molecule so as to more easily form the polymer matrix, as a basic skeleton, during the preparation of the gel polymer electrolyte.

A representative example of the multifunctional (meth)acrylate-based compound may be at least one compound selected from the group consisting of methyl acrylate, methyl methacrylate, ethyl acrylate, ethyl methacrylate, propyl acrylate, propyl methacrylate, butyl acrylate, butyl methacrylate, hexyl acrylate, hexyl methacrylate, ethylhexyl acrylate, ethylhexyl methacrylate, 2,2,2-trifluoroethyl acrylate, 2,2,2-trifluoroethyl methacrylate, 2,2,3,3-tetrafluoropropyl acrylate, 2,2,3,3-tetrafluoropropyl methacrylate, tetraethylene glycol diacrylate, polyethylene glycol diacrylate, 1,4-butanediol diacrylate, 1,6-hexanediol diacrylate, trimethylolpropane triacrylate, trimethylolpropane ethoxylate triacrylate, trimethylolpropane propoxylate triacrylate, ditrimethylolpropane tetraacrylate, pentaerythritol tetraacrylate, pentaerythritol ethoxylate tetraacrylate, dipentaerythritol pentaacrylate, dipentaerythritol hexaacrylate, polyethylene glycol diglycidyl ether, glycidyl methacrylate, polyethyleneamine, 1,5-hexadiene diepoxide, 4-vinylcyclohexene dioxide, 1,2,7,8-diepoxyoctane, diglycidyl 1,2-cyclohexanedicarboxylate, glycerol propoxylate triglycidyl ether, butyl glycidyl ether, ethylene glycol diglycidyl ether, and glycerol triglycidyl ether.

Also, a method of gelating the gel polymer electrolyte of the present invention is not particularly limited and may be performed according to a conventional method known in the art.

Specifically, i) a gel polymer electrolyte including a polymer matrix may be prepared by preparing a composition for a gel polymer electrolyte including the oligomer represented by Formula 1, a non-fluoride oxygen scavenger, a polymerization initiator, an electrolyte salt, an organic solvent, and selectively a multifunctional (meth)acrylate-based compound, then injecting the composition into a battery, and performing a polymerization reaction. Also, ii) a gel polymer electrolyte including a polymer matrix may be prepared by forming the polymer matrix by polymerization of the oligomer represented by Formula 1, a non-fluoride oxygen scavenger, and selectively a multifunctional (meth)acrylate-based compound in the presence of a polymerization initiator in an electrochemical device, and then further injecting an electrolyte solution including an electrolyte salt and an organic solvent.

In this case, the polymerization reaction may be performed by conventional thermal, e-beam, and gamma ray processes. If the polymerization reaction is thermal polymerization, it takes about 1 hour to 8 hours, and the thermal polymerization may be performed in a temperature range of 50° C. to 100° C.

With respect to conventional gelation, it is inconvenient that oxygen in the atmosphere, as a radical scavenger, must be blocked by normally performing radical polymerization under an inert condition. In contrast, in the present invention, since the non-fluoride oxygen scavenger is included in the composition for a gel polymer electrolyte, it is advantageous in that the polymerization reaction for the preparation of the gel polymer electrolyte may be performed even in the presence of normal air or oxygen. That is, since the non-fluoride oxygen scavenger may improve the reactivity of the oligomers by reducing the influence of oxygen during the polymerization reaction, the extent of reaction may be increased to such an extent that there is little unreacted monomer present. As a result, the non-fluoride oxygen scavenger may improve disadvantages such as degradation of charge and discharge performance typically caused by the unreacted monomer remained in the battery. Particularly, the non-fluoride oxygen scavenger may further provide an effect of improving flame retardancy of the gel polymer electrolyte by including a flame retardant functional group.

Also, in an embodiment of the present invention, provided is a gel polymer electrolyte formed by polymerization of the composition for a gel polymer electrolyte of the present invention.

Furthermore, in an embodiment of the present invention, provided is a lithium secondary battery including:

a positive electrode, a negative electrode, and a gel polymer electrolyte disposed between the positive electrode and the negative electrode, wherein the gel polymer electrolyte is formed by polymerization of the composition for a gel polymer electrolyte of the present invention.

The lithium secondary battery may further include a separator.

Specifically, the lithium secondary battery of the present invention may be prepared by injecting the non-aqueous electrolyte solution of the present invention into an electrode assembly which is formed by sequentially stacking the positive electrode, the negative electrode, and the separator selectively disposed between the positive electrode and the negative electrode. In this case, those typically used in the preparation of the lithium secondary battery may all be used as the positive electrode, the negative electrode, and the separator which constitute the electrode assembly.

The positive electrode and negative electrode constituting the lithium secondary battery of the present invention may be prepared by a typical method and used.

First, the positive electrode may be prepared by forming a positive electrode material mixture layer on a positive electrode collector. The positive electrode material mixture layer may be prepared by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-z}Ni_zO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., Li $(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, Li $(Ni_{0.7}Mn_{0.15}Co_{0.15})O_2$, or $Li(Ni_{0.8}Mn_{0.1}Co_{0.01})O_2$), or lithium nickel cobalt aluminum oxide (e.g., $LiNi_{0.8}Co_{0.15}Al_{0.05}O_2$, etc.).

The positive electrode active material may be included in an amount of 80 wt % to 99 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has conductivity without causing adverse chemical changes in the battery, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 50 wt % to 95 wt %, for example, 70 wt % to 90 wt %.

Also, the negative electrode may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 µm to 500 µm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \le x \le 1$), $Li_xWO_2$ ($0 \le x \le 1$), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; $0<x \le 1$; $1 \le y \le 3$; $1 \le z \le 8$) may be used as the metal composite oxide.

The material, which may be doped and undoped with lithium, may include Si, $SiO_x$ ($0<x \le 2$), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. The same material as or a different material from the conductive agent used in the preparation of the positive electrode may be used as the conductive agent, and, for example, a conductive material, such as: carbon powder such as carbon black, acetylene black (or Denka black), Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water, or an organic solvent, such as NMP and alcohol, and may be used in an amount such that desirable viscosity is obtained when the negative electrode active material as well as selectively the binder and the conductive agent is included. For example, the solvent may be included so that a concentration of the solid content in the slurry including the negative electrode active material as well as selectively the binder and the conductive agent is in a range of 50 wt % to 95 wt %, for example, 70 wt % to 90 wt %.

Also, the separator plays a role in blocking an internal short circuit between both electrodes and impregnating the electrolyte, wherein, after a separator composition is prepared by mixing a polymer resin, a filler, and a solvent, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene-butene copolymer, an ethylene-hexene copolymer, and an ethylene-methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

After a mixed solution was prepared by dissolving $LiPF_6$ in a solvent composed of ethylene carbonate (EC):propylene carbonate (PC):ethylmethyl carbonate (EMC) (1:1:1 vol %) in air to obtain a concentration of 1 M, 5 g of the oligomer represented by Formula 1a (weight-average molecular weight (Mw) of 8,000, z1=10, K1=9), 2 g of tris(methylsilyl) phosphite, and 0.02 g of 2,2'-azobis(iso-butyronitrile) (AIBN), as a polymerization initiator, were added to 92.98 g of the mixed solution to prepare a composition for a gel polymer electrolyte (see Table 1 below).

Example 2

A composition for a gel polymer electrolyte was prepared in the same manner as in Example 1 except that the oligomer represented by Formula 1b (weight-average molecular weight (Mw) of 8,000, z2=5, K2=9) was added instead of the oligomer represented by Formula 1a and 0.001 g of AIBN was added as a polymerization initiator to 92.999 g of the mixed solution (see Table 1 below).

Example 3

A composition for a gel polymer electrolyte was prepared in the same manner as in Example 2 except that the oligomer represented by Formula 1c (weight-average molecular weight (Mw) of 8,000, z3=5, K3=9) was added, instead of the oligomer represented by Formula 1b, to 92.999 g of the mixed solution (see Table 1 below).

Example 4

A composition for a gel polymer electrolyte was prepared in the same manner as in Example 1 except that 10 g of the oligomer represented by Formula 1a was added and 10 g of trisphenylsilyl phosphite was added to 79.98 g of the mixed solution (see Table 1 below).

Example 5

A composition for a gel polymer electrolyte was prepared in the same manner as in Example 4 except that the oligomer represented by Formula 1b (weight-average molecular weight (Mw) of 8,000, z2=5, K2=9) was added instead of the oligomer represented by Formula 1a (see Table 1 below).

Example 6

A composition for a gel polymer electrolyte was prepared in the same manner as in Example 4 except that 15 g of the oligomer represented by Formula 1c (weight-average molecular weight (Mw) of 8,000, z3=5, K3=9) was added instead of the oligomer represented by Formula 1a and 0.03 g of AIBN, as a polymerization initiator, was added to 74.97 g of the mixed solution (see Table 1 below).

Example 7

A composition for a gel polymer electrolyte was prepared in the same manner as in Example 1 except that 20 g of the oligomer represented by Formula 1a, 15 g of tris(methylsilyl) phosphite, and 0.04 g of a polymerization initiator were added to 64.96 g of the mixed solution (see Table 1 below).

Example 8

A composition for a gel polymer electrolyte was prepared in the same manner as in Example 1 except that 25 g of the oligomer represented by Formula 1a, 20 g of tris(methylsilyl) phosphite, and 0.05 g of a polymerization initiator were added to 54.95 g of the mixed solution (see Table 1 below).

Comparative Example 1

A composition for a gel polymer electrolyte was prepared in the same manner as in Example 4 except that a non-fluoride oxygen scavenger was not included (see Table 1 below).

Comparative Example 2

A composition for a gel polymer electrolyte was prepared in the same manner as in Example 4 except that tris-2,2,2-trifluoroethyl phosphite (TFEPi), as a fluorine-based oxygen scavenger, was added instead of trisphenylsilyl phosphite (TPSPi) (see Table 1 below).

Comparative Example 3

A composition for a gel polymer electrolyte was prepared in the same manner as in Comparative Example 1 except that 10 g of an oligomer represented by Formula 2, 0.5 g of trisphenylsilyl phosphite, and 0.02 g of a polymerization initiator were added to 89.48 g of the mixed solution (see Table 1 below).

[Formula 2]

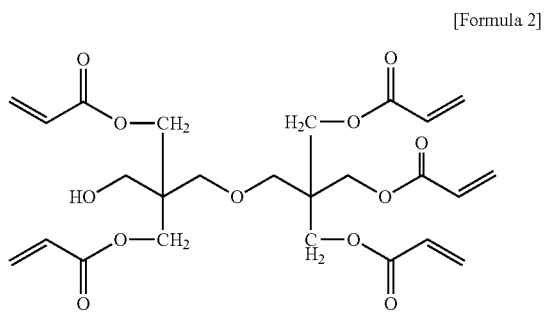 [SMILES: C=CC(=O)OCC(CO)(COCC(COC(=O)C=C)(COC(=O)C=C)COC(=O)C=C)COC(=O)C=C]

Comparative Example 4

A composition for a gel polymer electrolyte was prepared in the same manner as in Comparative Example 2 except that an oligomer represented by the following Formula 3 was included instead of the oligomer represented by Formula 1a and 10 g of trisphenylsilyl phosphite was added as an oxygen scavenger (see Table 1 below).

[Formula 3]

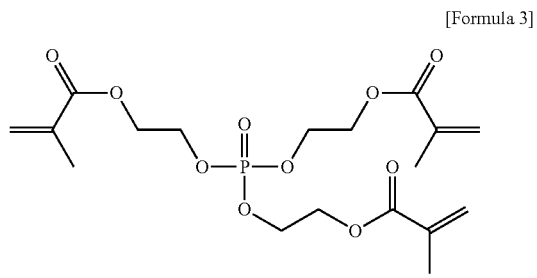 [SMILES: C=C(C)C(=O)OCCOP(=O)(OCCOC(=O)C(=C)C)OCCOC(=O)C(=C)C]

Comparative Example 5

A composition for a gel polymer electrolyte was prepared in the same manner as in Example 1 except that an oligomer represented by the following Formula 4 (weight-average molecular weight (Mw): 3,000, n5=5, m5=5, x5=10) was included instead of the oligomer represented by Formula 1a (see Table 1 below).

[Formula 4]

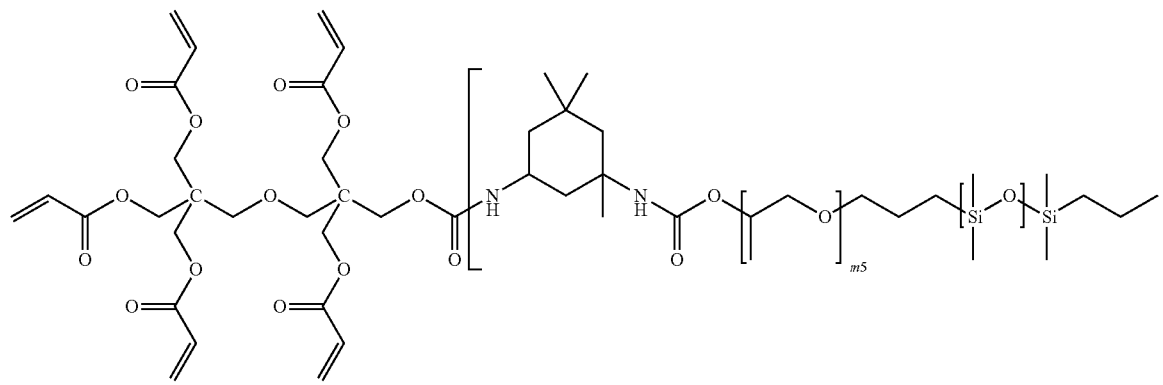

-continued

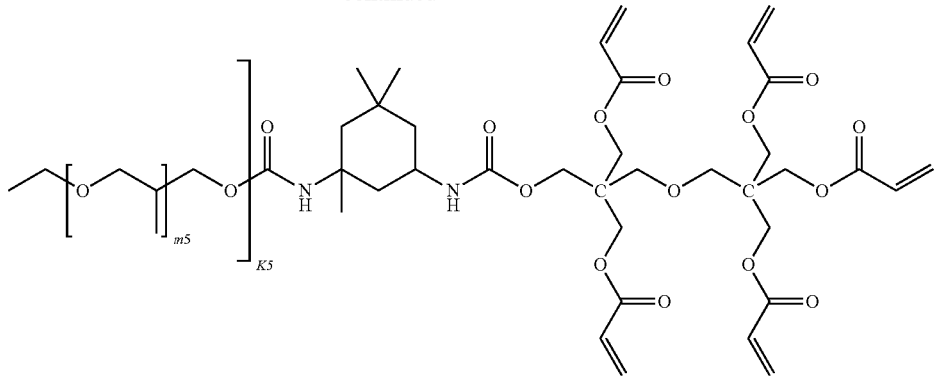

TABLE 1

| | | Oligomer | | | | | |
|---|---|---|---|---|---|---|---|
| | Formula | Weight-average molecular weight (Mw) | The number of repeating units | Amount added (g) | Oxygen scavenger | Amount of oxygen scavenger added (g) | Amount of polymerization initiator added (g) |
| Example 1 | 1a | 8,000 | Z1 = 10, K1 = 9 | 5 | TMSPi | 2 | 0.02 |
| Example 2 | 1b | 8,000 | Z2 = 5, K2 = 9 | 5 | TMSPi | 2 | 0.001 |
| Example 3 | 1c | 8,000 | Z3 = 5, K3 = 9 | 5 | TMSPi | 2 | 0.001 |
| Example 4 | 1a | 8,000 | Z1 = 10, K1 = 9 | 10 | TPSPi | 10 | 0.02 |
| Example 5 | 1b | 8,000 | Z2 = 5, K2 = 9 | 10 | TPSPi | 10 | 0.02 |
| Example 6 | 1c | 8,000 | Z3 = 5, K3 = 9 | 15 | TPSPi | 10 | 0.03 |
| Example 7 | 1a | 8,000 | Z1 = 10, K1 = 9 | 20 | TMSPi | 15 | 0.04 |
| Example 8 | 1a | 8,000 | Z1 = 10, K1 = 9 | 25 | TMSPi | 20 | 0.05 |
| Comparative Example 1 | 1a | 8,000 | Z1 = 10, K1 = 9 | 10 | — | — | 0.02 |
| Comparative Example 2 | 1a | 8,000 | Z1 = 10, K1 = 9 | 10 | TFEPi | 10 | 0.02 |
| Comparative Example 3 | — | — | — | 10 | TMSPi | 0.5 | 0.02 |
| Comparative Example 4 | — | — | — | 10 | TMSPi | 10 | 0.02 |
| Comparative Example 5 | — | 3,000 | — | 5 | TMSPi | 2 | 0.02 |

* TMSPi: tris(methylsilyl) phosphite
TPSPi: trisphenylsilyl phosphite
TFEPi: tris-2,2,2-trifluoroethyl phosphite Experimental Example 1

Measurement of the Presence of Pre-Gelation at Room Temperature

After each of the compositions for a gel polymer electrolyte of Examples 1 to 8 and the compositions for a gel polymer electrolyte of Comparative Examples 1 to 5 was put in a vial in a glove box having an internal temperature of 25° C. and oxygen was injected into the vial, the presence of pre-gelation at room temperature of each composition for a gel polymer electrolyte was observed while each vial was left standing for about 4 days at room temperature (25±5° C.), and the results thereof are presented in the following Table 2.

Also, after each of the compositions for a gel polymer electrolyte of Examples 1 to 8 and the compositions for a gel polymer electrolyte of Comparative Examples 1 to 5 was put in a vial in a glove box having an internal temperature of 25° C. and oxygen was injected into the vial, polymerization reactivity (measurement of amount of free liquid), after a polymerization reaction was performed at 65° C. for 5 hours, was visually observed, and the results thereof are presented in the following Table 2.

The presence of pre-gelation at room temperature may be determined by measuring a degree of gelation of the composition for forming a gel polymer electrolyte. That is, when the gelation of the composition for forming a gel polymer electrolyte proceeds, viscosity of the composition increases and transparency decreases. Thus, the measurement of the degree of gelation may be performed by the measurement of the viscosity of the composition and the observation of the transparency of the composition. The viscosity measurement may be performed by using a typical viscosity measuring device, and the transparency may be measured through visual observation. In this case, the degree of gelation was determined by two classes, "non-gelation" and 'gelation", wherein the expression "non-gelation" was a case where there was no change in viscosity outside an error range of the viscosity measurement and no change in transparency was observed, and the expression "gelation" was a case where a change in viscosity occurred to an extent that deviated from the error range of the viscosity measurement or a change in transparency was observed.

TABLE 2

|  | 25 ± 5° C. | | | 60° C. | |
| --- | --- | --- | --- | --- | --- |
|  | | | | Before | After |
|  | 1 day | 2 days | 4 days | polymerization | polymerization |
| Example 1 | Non-gelation | Non-gelation | Non-gelation | Non-gelation | Gelation |
| Example 2 | Non-gelation | Non-gelation | Non-gelation | Non-gelation | Gelation |
| Example 3 | Non-gelation | Non-gelation | Non-gelation | Non-gelation | Gelation |
| Example 4 | Non-gelation | Non-gelation | Non-gelation | Non-gelation | Gelation |
| Example 5 | Non-gelation | Non-gelation | Non-gelation | Non-gelation | Gelation |
| Example 6 | Non-gelation | Non-gelation | Non-gelation | Non-gelation | Gelation |
| Example 7 | Non-gelation | Non-gelation | Non-gelation | Non-gelation | Gelation |
| Example 8 | Non-gelation | Non-gelation | Non-gelation | Non-gelation | Gelation |
| Comparative Example 1 | Non-gelation | Non-gelation | Non-gelation | Non-gelation | Non-gelation |
| Comparative Example 2 | Non-gelation | Gelation | Gelation | Gelation | Gelation |
| Comparative Example 3 | Non-gelation | Gelation | Gelation | Gelation | Gelation |
| Comparative Example 4 | Non-gelation | Gelation | Gelation | Gelation | Gelation |
| Comparative Example 5 | Non-gelation | Non-gelation | Non-gelation | Non-gelation | Non-gelation |

As illustrated in Table 2, with respect to the compositions for a gel polymer electrolyte of Examples 1 to 8 of the present invention, it may be confirmed that the gelation did not proceed at room temperature and the gelation occurred after the polymerization. From these results, with respect to the compositions for a gel polymer electrolyte of the present invention, it may be understood that the pre-gelation did not occur during liquid injection and wetting processes, but the gelation occurred during the polymerization for the preparation of the gel polymer electrolyte.

In contrast, with respect to the composition for a gel polymer electrolyte of Comparative Example 1 which did not include a non-fluoride oxygen scavenger, gelation did not occur even after the polymerization as well as at room temperature due to an excessive amount of oxygen.

Also, with respect to the composition for a gel polymer electrolyte of Comparative Example 2 which included a fluorine-based oxygen scavenger, it may be understood that pre-gelation occurred at room temperature before the polymerization.

Furthermore, with respect to the compositions for a gel polymer electrolyte of Comparative Examples 3 and 4 which respectively included the oligomers having structures different from that of the present invention, it may be understood that gelation occurred at room temperature.

With respect to the composition for a gel polymer electrolyte of Comparative Example 5 including the oligomer having a structure in which a Si element was further included in comparison to the oligomer of the present invention, since a portion occupied by acrylate in the total molecular weight was relatively small and the amount of the oligomer in the electrolyte composition was low at 5 wt %, gelation did not proceed even at high temperatures.

Experimental Example 2

Measurement of the Presence of Metal Dissolution 40 parts by weight of a solid content, in which a ternary active material ($Li(Ni_{0.5}Mn_{0.3}Co_{0.2})O_2$) as a positive electrode active material, carbon black as a conductive agent, and polyvinylidene fluoride (PVDF), as a binder, were mixed in a ratio of 90:5:5 (wt %), was added to 100 parts by weight of N-methyl-2-pyrrolidone (NMP) to prepare a positive electrode active material slurry. A 100 μm thick positive electrode collector (Al thin film) was coated with the positive electrode active material slurry, dried, and roll-pressed to prepare a positive electrode.

100 parts by weight of a solid content, in which graphite as a negative electrode active material, PVDF as a binder, and carbon black, as a conductive agent, were mixed in a ratio of 90:5:5 (wt %), was added to 100 parts by weight of NMP to prepare a negative electrode active material slurry. A 90 μm thick negative electrode collector (Cu thin film) was coated with the negative electrode active material slurry, dried, and roll-pressed to prepare a negative electrode.

After the positive electrode and negative electrode prepared by the above-described method were stacked with a polyethylene porous film to prepare an electrode assembly, the electrode assembly was put in a battery case, each of the compositions for a gel polymer electrolyte prepared in Examples 1 and 2 and Comparative Examples 1 and 2 was injected thereinto, and polymerization was performed at 65° C. for 5 hours to prepare each pouch type lithium secondary battery including a gel polymer electrolyte.

Subsequently, after storing each secondary battery at a high temperature for 10 weeks at a state of charge (SOC) of 100%, 1 g of the gel polymer electrolyte was taken from each of the secondary batteries, and 2 mL of concentrated hydrochloric acid and 200 μl of hydrogen peroxide were then added thereto and mixed. Thereafter, a sample was dissolved at room temperature and heated on a hot plate to remove hydrogen peroxide in the sample.

Next, after the sample was cooled to room temperature, 10 mL of ultra-pure water was added thereto, the presence of metal dissolution was confirmed by analyzing the resultant product thus obtained by inductively coupled plasma optical emission spectrometry (ICP-OES), and the results thereof are then presented in Table 3 below.

TABLE 3

|  | Ni content (mg/kg) | Co content (mg/kg) | Mn (mg/kg) |
|---|---|---|---|
| Example 1 | 85 | 44 | 83 |
| Example 2 | 90 | 45 | 82 |
| Comparative Example 1 | 117 | 55 | 140 |
| Comparative Example 2 | 132 | 57 | 180 |

Transition metals, which were included in each gel polymer electrolyte by being dissolved from the positive electrode during charge and discharge, were analyzed in Table 3, wherein, as illustrated in Table 3, it may be understood that each of the metals was included in an amount of about 100 mg or less in the gel polymer electrolyte prepared by using the composition for a gel polymer electrolyte of Examples 1 and 2 of the present invention, but each of the metals except Co was included in an amount of greater than about 100 mg in the gel polymer electrolytes prepared by using the compositions for a gel polymer electrolyte of Comparative Examples 1 and 2.

From these results, in a case in which the gel polymer electrolyte composition of the present invention was used, since wetting was improved and an electrode side reaction was reduced, it may be understood that the dissolution of the transition metals from the positive electrode was suppressed during charge and discharge.

Experimental Example 3

Resistance Measurement Evaluation

Pouch type secondary batteries were respectively prepared in the same manner as in Experimental Example 2 by using the compositions for a gel polymer electrolyte of Examples 1 and 2 and the compositions for a gel polymer electrolyte of Comparative Examples 1, 2, and 5.

Subsequently, the SOC of each pouch type secondary battery was set to 50 at 25° C., and each secondary battery was then subjected to a 5 C rate discharge pulse for 10 seconds to confirm a resistance value of each secondary battery through the voltage drop thus obtained. The results thereof are presented in FIGS. 1 and 2.

First, when the resistance values of the secondary batteries using the compositions for a gel polymer electrolyte of Examples 1 and 2 and the secondary batteries using the compositions for a gel polymer electrolyte of Comparative Examples 1, 2, and 5 were confirmed through a graph of FIG. 1, it may be understood that the resistance values of the secondary batteries of Examples 1 and 2 were low at 67 mohm or less, but, with respect to the pouch type secondary batteries using the compositions for a gel polymer electrolyte of Comparative Examples 1 and 5, the resistance values were slightly increased to 68 mohm and 69 mohm, respectively, and the resistance value of the secondary battery using the composition for a gel polymer electrolyte of Comparative Example 2 was significantly increased to 76 mohm.

Figure 2:
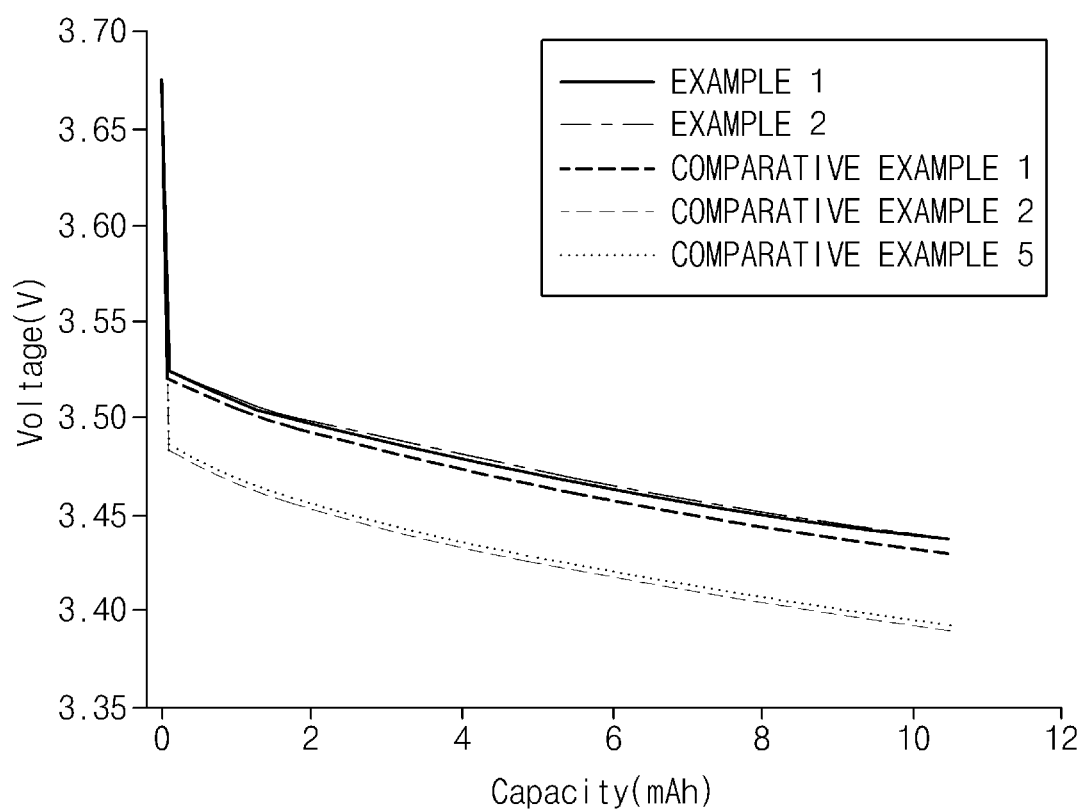

Also, referring to FIG. 2, it may be understood that, with respect to the pouch type secondary batteries using the compositions for a gel polymer electrolyte of Examples 1 and 2, a voltage drop of about 3.53 V occurred so as to increase capacity (capacity=current×time), but, with respect to the secondary batteries using the compositions for a gel polymer electrolyte of Comparative Examples 2 and 5, large voltage drops of 3.48 V and 3.46 V respectively occurred due to the high resistance values.

With respect to the pouch type secondary battery using the composition for a gel polymer electrolyte of Comparative Example 1, it may be understood that, while a gelation reaction did not occur and the composition for a gel polymer electrolyte was present in a liquid state, the voltage drop was relatively smaller than that of the secondary battery using the composition for a gel polymer electrolyte of Example 1.

Experimental Example 4

Measurement of Alternative-Current (AC) Impedance (ACI)

Pouch type secondary batteries were respectively prepared in the same manner as in Experimental Example 2 by using the compositions for a gel polymer electrolyte of Examples 1 and 2 and the compositions for a gel polymer electrolyte of Comparative Examples 1, 2, and 5.

Subsequently, after each pouch type secondary battery was stored at 50% SOC at a temperature of 25° C. for 1 hour, AC impedance of the battery was measured by electrochemical impedance spectroscopy (EIS) using a VMP3 model by Bio-logic Science Instruments SAS while scanned from 10 KHz to 10 mHz. In this case, an amplitude of alternating current was 10 mV, and a direct current (DC) potential of the battery was 3.68 V. The results thereof are presented in FIG. 3.

Figure 3:
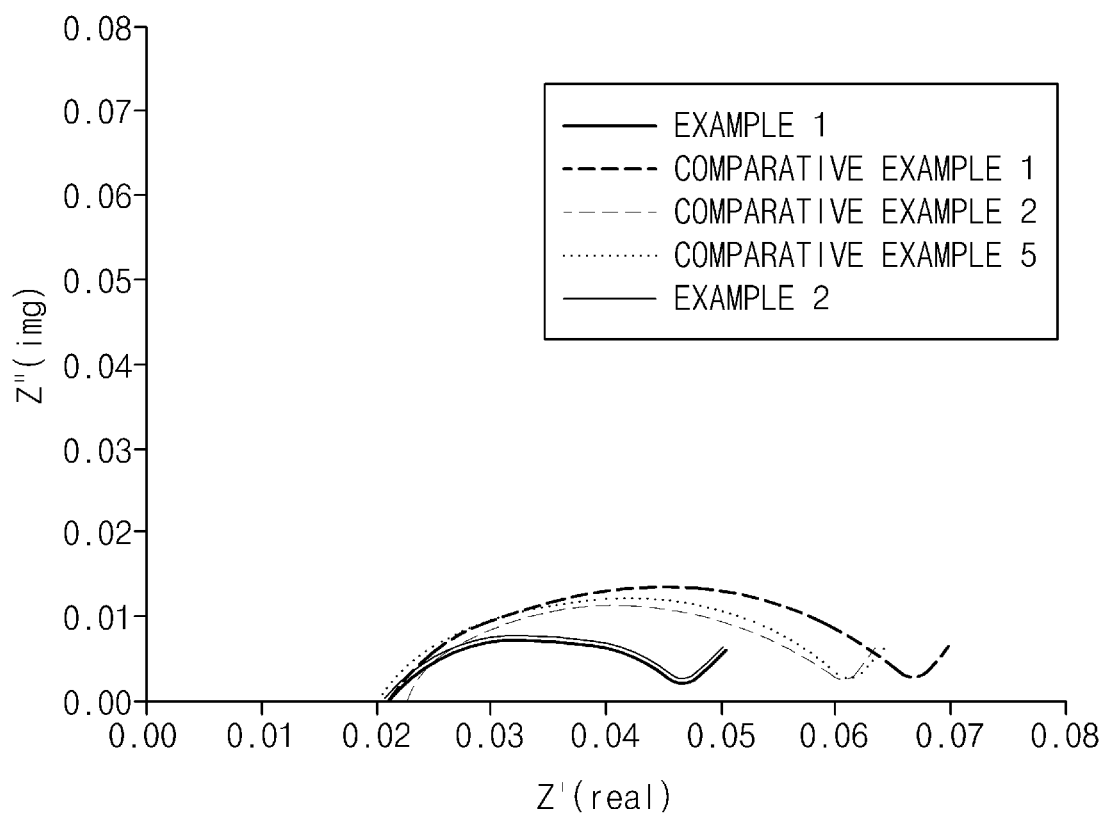
FIG. 3 is a graph showing AC impedances of lithium secondary batteries in Experimental Example 4 of the present invention.

In a graph of FIG. 3, a point of intersection with the X-axis denotes ohmic resistance of the battery, and a half circle in the rear part denotes resistance by a solid electrolyte interface (SEI) formed on the surface of an electrode plate. That is, it denotes that the smaller the diameter of the half circle is, the smaller the resistance value caused by the SEI is.

As illustrated in FIG. 3, it may be understood that, with respect to the secondary batteries using the compositions for a gel polymer electrolyte of Examples 1 and 2, resistances were low because a pre-gel reaction did not occur during the wetting process and a residual oligomer was not generated during the polymerization, but, with respect to the pouch type secondary battery using the composition for a gel polymer electrolyte of Comparative Example 2, since wetting was reduced while the pre-gelation occurred, interfacial resistance was significantly increased.

Also, with respect to the secondary battery using the composition for a gel polymer electrolyte of Comparative Example 1, it may be understood that, since a side reaction occurred on the surface of the negative electrode due to the oligomer remaining without polymerization, resistance was higher than that of the pouch type secondary battery of Example 1.

With respect to the secondary battery using the composition for a gel polymer electrolyte of Comparative Example 5, although the side reaction due to the residual oligomer occurred while the gelation did not proceed as in Comparative Example 1, the amount of the oligomer capable of reacting on the surface was small at about 5%, and thus, it may be understood that resistance similar to that of Comparative Example 2 was obtained.

Experimental Example 5

Measurement of Amount of Generated Gas

A liquid electrolyte solution was prepared by dissolving $LiPF_6$ in an organic solvent composed of ethylene carbonate (EC):propylene carbonate (PC):ethylmethyl carbonate (EMC) (1:1:1 vol %) to obtain a concentration of 1 M (Reference Example). Subsequently, a pouch type secondary battery (Reference Example) containing a liquid electrolyte solution was prepared in the same manner as in Experimental Example 2 except that the above-prepared liquid electrolyte solution was used instead of the composition for a gel polymer electrolyte during the preparation of the pouch type secondary battery of Experimental Example 2.

Subsequently, pouch type secondary batteries respectively using the compositions for a gel polymer electrolyte of Example 1 and Comparative Example 1 were prepared in the same manner as in Experimental Example 2.

Next, after each of the pouch type secondary batteries using the compositions for a gel polymer electrolyte of Example 1 and Comparative Example 1 and the pouch type secondary battery containing the liquid electrolyte solution of Reference Example was fully charged at a constant current-constant voltage of 0.33 C/4.15 V at room temperature, each battery was left standing at 60° C. for 10 weeks and gas generated was then extracted.

After the charge and discharge, amounts of hydrocarbon and natural gas in each secondary battery were analyzed using AMT-4197-0K (High Throughput system analysis method), and types and concentrations of gases generated in 11 different batteries were analyzed according to the qualitative analysis of the hydrocarbon and natural gas in each secondary battery using AMT-5187-0k (GC-MSD-TCD analysis method).

The results thereof are presented in FIG. 4 below.

Figure 4:
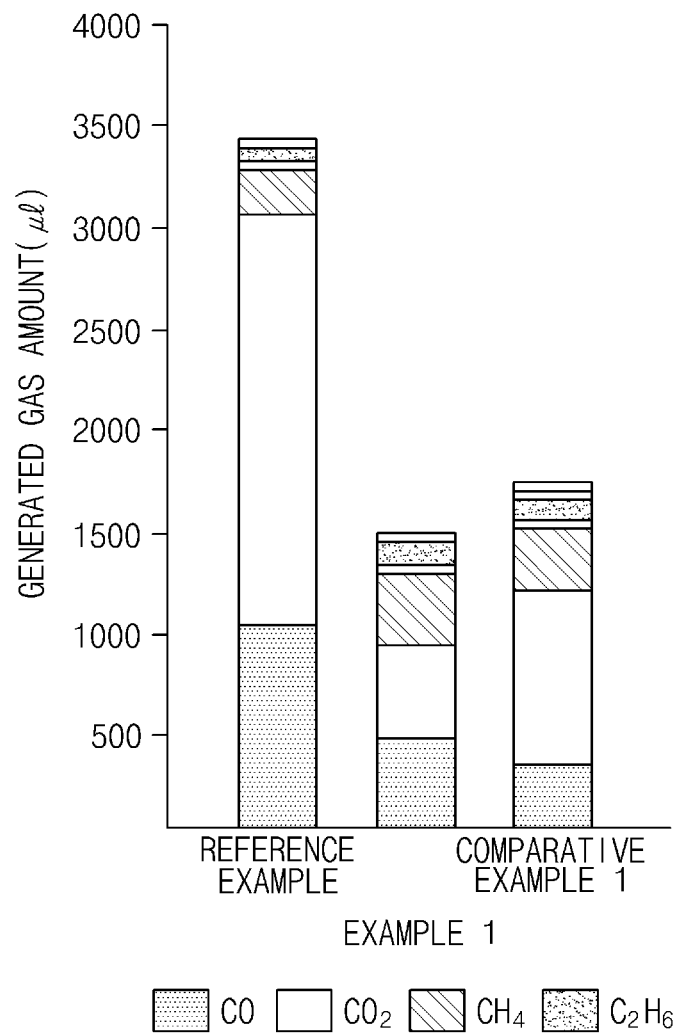
FIG. 4 is a graph showing amounts of gas generated in lithium secondary batteries according to Experimental Example 5 of the present invention.

As illustrated in FIG. 4, with respect to the pouch type secondary battery using the composition for a gel polymer electrolyte of Example 1 of the present invention, since reactivity of the electrolyte on the surface of the positive electrode was suppressed (oxidation stability improvement) during high-temperature (60° C.) storage at a SOC of 100%, it may be understood that an amount of CO released was 500 μl and an amount of $CO_2$ released was low at 400 μl.

In contrast, with respect to the pouch type secondary battery of Reference Example, an amount of CO released was 1,000 μl, and an amount of $CO_2$ released was 2,000 μl, wherein it may be understood that a large amount of $CO_2$ was released. Also, with respect to the pouch type secondary battery using the composition for a gel polymer electrolyte of Comparative Example 1, it may be understood that an amount of CO released was reduced to 300 μl, but an amount of $CO_2$ released was increased to 900 μl.

Experimental Example 6

Capacity Measurement

Pouch type secondary batteries were respectively prepared in the same manner as in Experimental Example 2 by using the compositions for a gel polymer electrolyte of Examples 1 and 2 and the compositions for a gel polymer electrolyte of Comparative Examples 1, 2, and 5.

Each pouch type secondary battery was charged and discharged at room temperature (25° C.) under 1 C charge and 1 C discharge conditions, and initial capacity of each battery was measured. The results thereof are presented in FIG. 5.

Also, charge/discharge were performed at room temperature (25° C.) under 0.5 C charge and 0.5 C discharge conditions, and initial capacity of each battery was measured. The results thereof are presented in FIG. 6.

Figure 5:
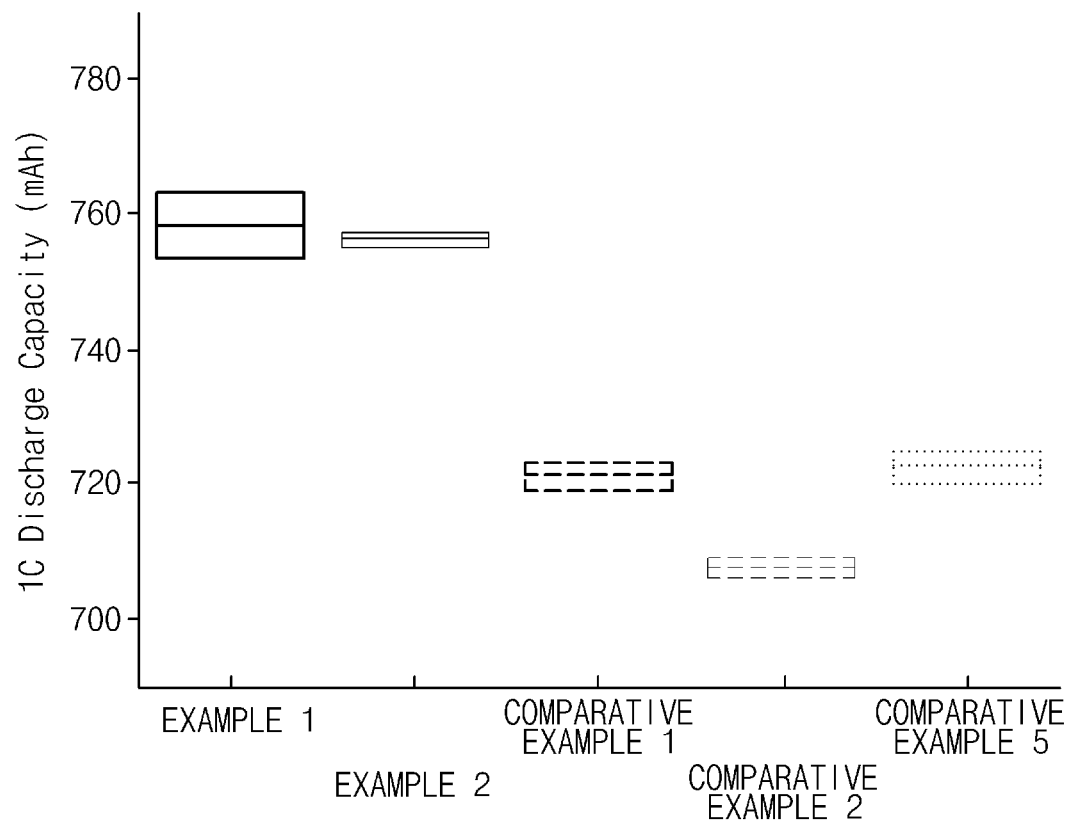
FIGS. 5 and 6 are graphs showing initial discharge capacities of secondary batteries according to Experimental Example 6 of the present invention.
Figure 6:
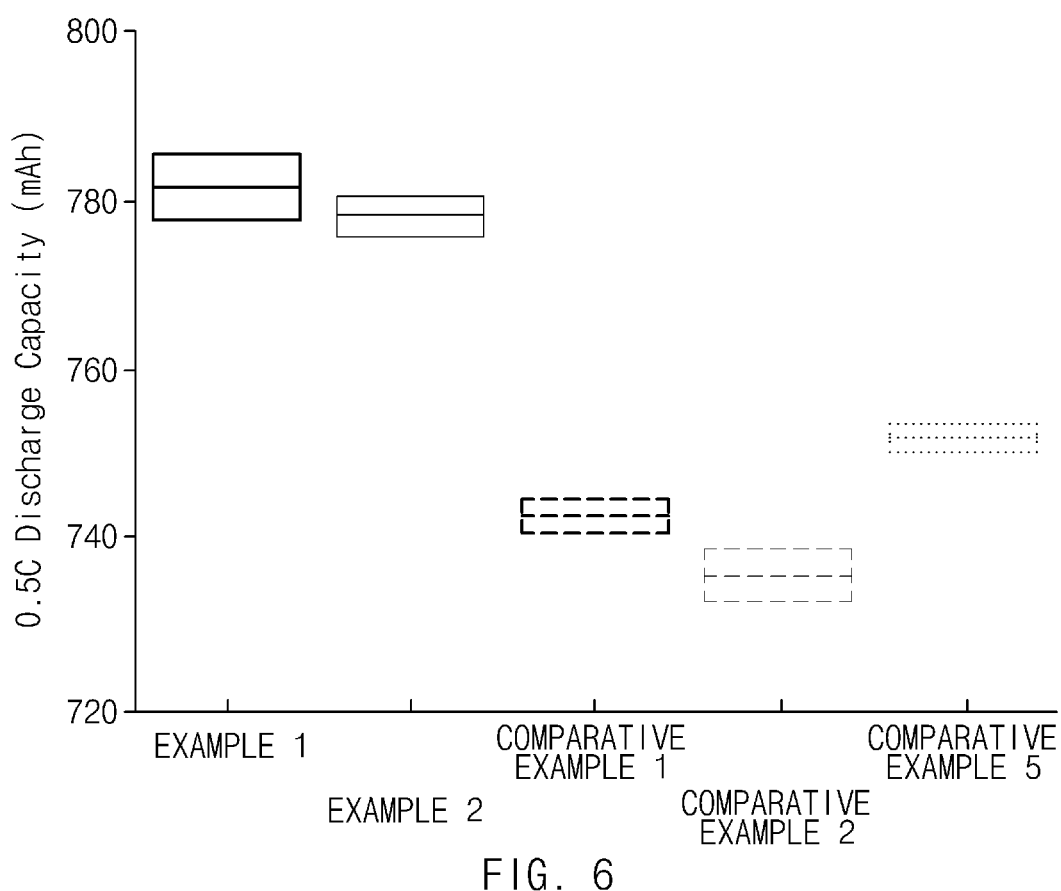

As illustrated in FIGS. 5 and 6, after charge and discharge were respectively performed at 1 C/1 C and 0.5 C/0.5 C, the initial capacities of the pouch type secondary batteries using the compositions for a gel polymer electrolyte of Comparative Examples 1, 2, and 5 were in a range of about 710 mAh to about 730 mAh, but the initial capacities of the pouch type secondary batteries using the compositions for a gel polymer electrolyte of Examples 1 and 2 were 760 mAh and 780 mAh or more, respectively, wherein it may be understood that the initial capacities were increased by about 5% to about 7% in comparison to the initial capacities of the pouch type secondary batteries using the compositions for a gel polymer electrolyte of Comparative Examples 1, 2, and 5.

Experimental Example 7

Evaluation of Capacity Retention with Cycles at Room Temperature

Pouch type secondary batteries using the compositions for a gel polymer electrolyte of Examples 1 to 4 and the compositions for a gel polymer electrolyte of Comparative Examples 1 and 2 were respectively prepared in the same manner as in Experimental Example 2.

Subsequently, each pouch type secondary battery was charged at a constant current of 1 C to a voltage of 4.15 V at 25° C., was left standing for 10 minutes, and was then discharged at a constant current of 1 C until the voltage reached 2.5 V. The charge and discharge were repeated for 1,000 cycles, and battery capacity was then measured and presented in FIG. 7.

Figure 7:
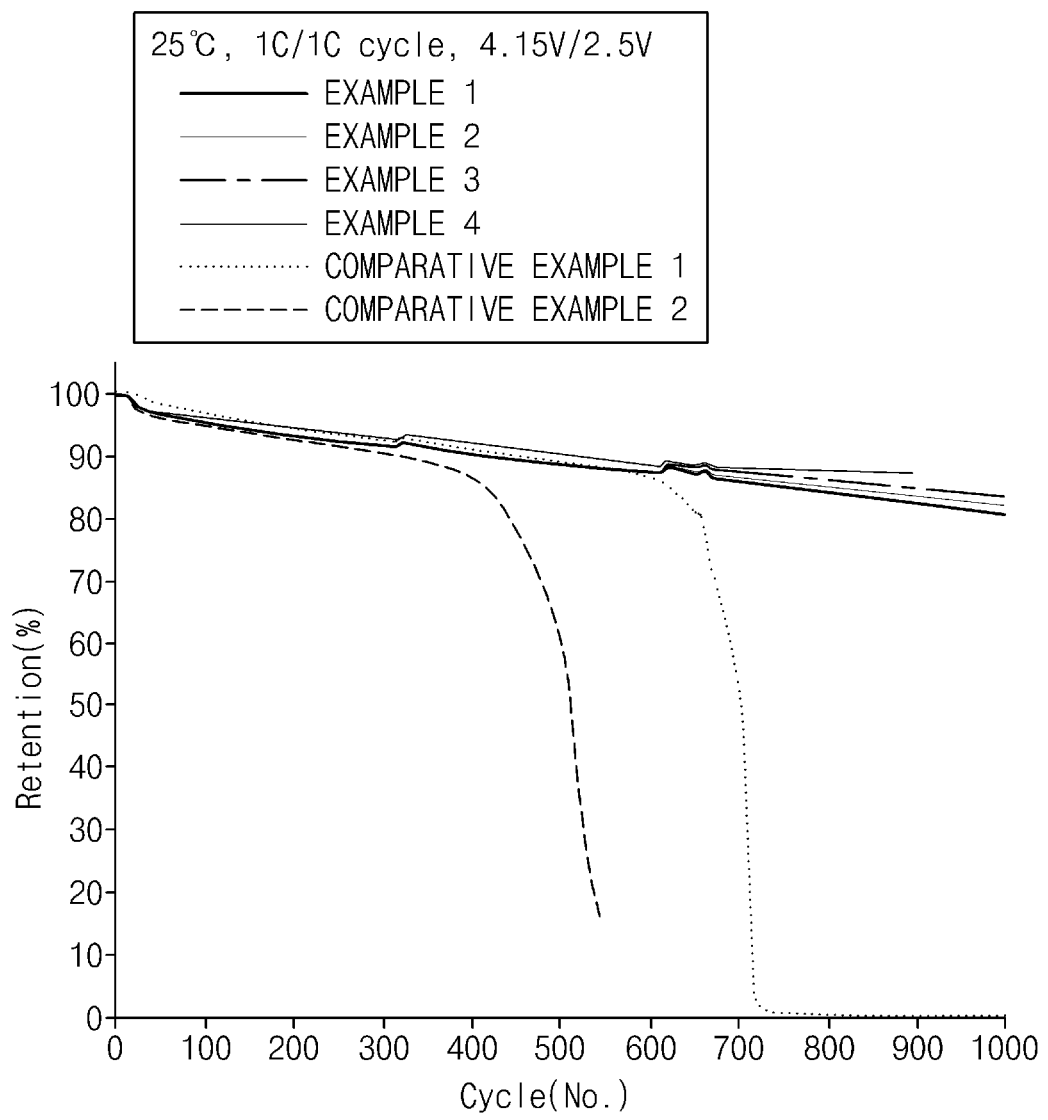
FIG. 7 is a graph showing capacity change rates of lithium secondary batteries in Experimental Example 7 of the present invention.

As illustrated in FIG. 7, it may be confirmed that, with respect to the pouch type secondary batteries using the compositions for a gel polymer electrolyte of Examples 1 to 4, capacity retentions (%) hardly changed even after 1,000 cycles.

In contrast, the pouch type secondary battery using the gel polymer electrolyte of Comparative Example 1 exhibited capacity retention similar to those of the pouch type secondary batteries using the compositions for a gel polymer electrolyte of Examples 1 to 4 of the present invention up to initial 600 cycles, but the capacity retention was significantly decreased from about 650 cycles and rapidly decreased to less than about 10% in a 700th cycle.

Also, the pouch type secondary battery using the gel polymer electrolyte of Comparative Example 2 exhibited capacity retention similar to those of the pouch type secondary batteries using the compositions for a gel polymer electrolyte of Examples 1 to 4 of the present invention up to initial 300 cycles, but the capacity retention was gradually decreased from about 350 cycles and rapidly decreased to less than about 15% after about 500 cycles.

Form these results, the pouch type secondary batteries using the compositions for a gel polymer electrolyte of Examples 1 to 4 of the present invention may reduce interfacial reactions by using the non-fluoride oxygen scavenger, and, as a result, a robust SEI may be formed and a life degradation phenomenon caused by the collapse of the SEI may be suppressed. Therefore, it may be understood that capacity retentions with cycles at room temperature were significantly better than those of the pouch type secondary batteries using the compositions for a gel polymer electrolyte of Comparative Examples 1 and 2.

As described above, the present invention may provide a composition for a gel polymer electrolyte having improved liquid injection characteristics at room temperature and in an oxygen atmosphere by including a non-fluoride oxygen scavenger as well as a polymerizable oligomer having a polymerizable substituent. Also, a gel polymer electrolyte having reduced interfacial resistance and improved wetting may be prepared by using the composition, and a lithium secondary battery having excellent capacity retention with cycles may be prepared by including the gel polymer electrolyte.

What is claimed is:

1. A composition for a gel polymer electrolyte, the composition comprising an electrolyte salt, an organic solvent, an oligomer represented by Formula 1, a non-fluoride oxygen scavenger, and a polymerization initiator:

[Formula 1]

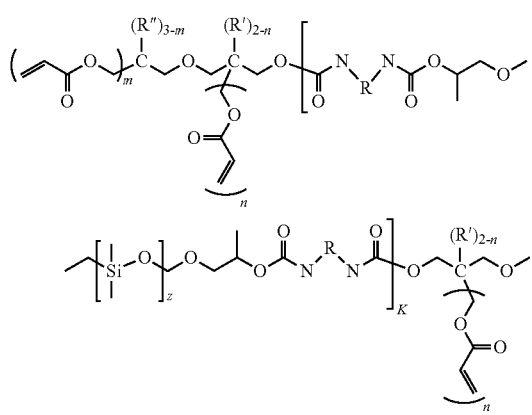

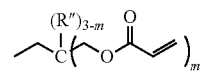

wherein, in Formula 1,
R is an aliphatic hydrocarbon group or an aromatic hydrocarbon group,
R' and R" are each independently hydrogen or an alkyl group having 1 to 3 carbon atoms,
n is an integer of 1 or 2,
m, z, and K are the numbers of repeating units,
m is an integer of 1 to 3,
z is an integer of 1 to 10,000, and
K is an integer of 1 to 100.

2. The composition for a gel polymer electrolyte of claim 1, wherein, in the oligomer represented by Formula 1, R is the aliphatic hydrocarbon group comprising at least one selected from the group consisting of:
at least one alicyclic hydrocarbon group selected from the group consisting of a substituted or unsubstituted cycloalkylene group having 4 to 20 carbon atoms; a substituted or unsubstituted cycloalkylene group having 4 to 20 carbon atoms which contains an isocyanate group (NCO); a substituted or unsubstituted cycloalkenylene group having 4 to 20 carbon atoms; and a substituted or unsubstituted heterocycloalkylene group having 2 to 20 carbon atoms, and
at least one linear hydrocarbon group selected from the group consisting of a substituted or unsubstituted alkylene group having 1 to 20 carbon atoms; a substituted or unsubstituted alkylene group having 1 to 20 carbon atoms which contains an isocyanate group (NCO); a substituted or unsubstituted alkoxylene group having 1 to 20 carbon atoms; a substituted or unsubstituted alkenylene group having 2 to 20 carbon atoms; and a substituted or unsubstituted alkynylene group having 2 to 20 carbon atoms.

3. The composition for a gel polymer electrolyte of claim 1, wherein, in the oligomer represented by Formula 1, R is the aromatic hydrocarbon group comprising at least one selected from the group consisting of a substituted or unsubstituted arylene group having 6 to 20 carbon atoms; and a substituted or unsubstituted heteroarylene group having 4 to 20 carbon atoms.

4. The composition for a gel polymer electrolyte of claim 1, wherein the oligomer represented by Formula 1 comprises at least one selected from the group consisting of compounds represented by Formulae 1a to 1c;

[Formula 1a]

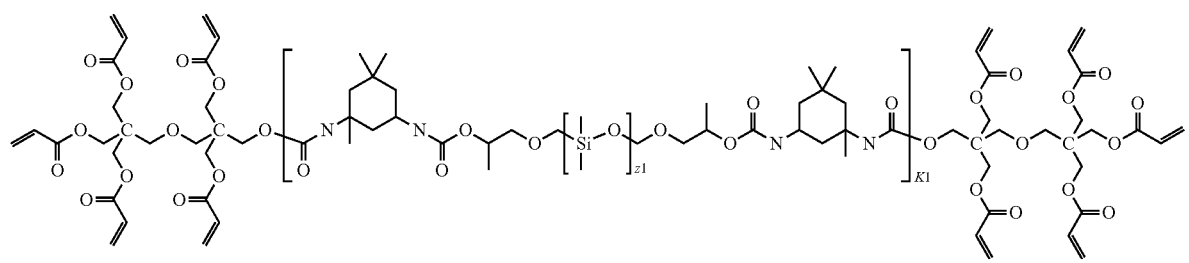

wherein, in Formula 1a,
z1 and K1 are the numbers of repeating units,
z1 is an integer of 1 to 500, and
K1 is an integer of 1 to 30;

[Formula 1b]

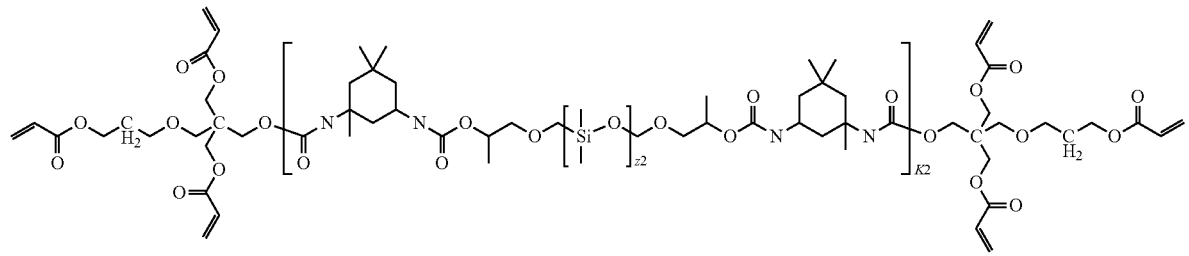

in Formula 1b,
z2 and K2 are the numbers of repeating units,
z2 is an integer of 1 to 500, and
K2 is an integer of 1 to 30;

[Formula 1c]

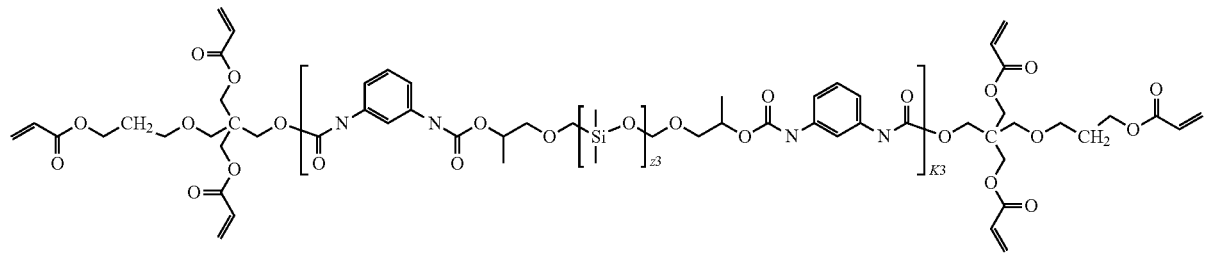

wherein, in Formula 1c,
z3 and K3 are the numbers of repeating units,
z3 is an integer of 1 to 500, and
K3 is an integer of 1 to 30.

5. The composition for a gel polymer electrolyte of claim 1, wherein the oligomer represented by Formula 1 is included in an amount of 0.5 wt % to 25 wt % based on a total weight of the composition for a gel polymer electrolyte.

6. The composition for a gel polymer electrolyte of claim 1, wherein the non-fluoride oxygen scavenger comprises at least one of a trisalkylsilylphosphite-based compound; and a trisarylsilylphosphite-based compound.

7. The composition for a gel polymer electrolyte of claim 6, wherein the non-fluoride oxygen scavenger comprises at least one selected from the group consisting of tris(methylsilyl) phosphite, tris(ethylsilyl) phosphite, tris(propylsilyl) phosphite, tris (butylsilyl) phosphite, and trisphenylsilyl phosphite.

8. The composition for a gel polymer electrolyte of claim 1, wherein the non-fluoride oxygen scavenger is included in an amount of 0.5 wt % to 15 wt % based on a total weight of the composition for a gel polymer electrolyte.

9. The composition for a gel polymer electrolyte of claim 8, wherein the non-fluoride oxygen scavenger is included in an amount of 0.5 wt % to 10 wt % based on the total weight of the composition for a gel polymer electrolyte.

10. A gel polymer electrolyte prepared by polymerizing the composition for a gel polymer electrolyte of claim 1.

11. A lithium secondary battery comprising a positive electrode, a negative electrode, and a gel polymer electrolyte disposed between the positive electrode and the negative electrode, wherein the gel polymer electrolyte comprises the gel polymer electrolyte of claim 10.

12. The composition for a gel polymer electrolyte of claim 1, wherein a weight-average molecular weight (Mw) of the oligomer represented by Formula 1 is in a range of 1,000 g/mol to 20,000 g/mol.

13. The composition for a gel polymer electrolyte of claim 1, wherein a weight-average molecular weight (Mw) of the oligomer represented by Formula 1 is in a range of 1,000 g/mol to 10,000 g/mol.

14. The composition for a gel polymer electrolyte of claim 1, wherein the non-fluoride oxygen scavenger is included in an amount of 0.5 wt % to 7 wt % based on a total weight of the composition for a gel polymer electrolyte.

15. The composition for a gel polymer electrolyte of claim 1, wherein the polymerization initiator comprises one selected from the group consisting of benzoyl peroxide, acetyl peroxide, dilauryl peroxide, di-tert-butyl peroxide, t-butylperoxy-2-ethyl-hexanoate, cumyl hydroperoxide, and hydrogen peroxide.

16. The composition for a gel polymer electrolyte of claim 1, wherein the polymerization initiator comprises at least one selected from the group consisting of azo compound selected from the group consisting of 2,2'-azobis(2-cyanobutane), 2,2'-azobis(methylbutyronitrile), 2,2'-azobis(isobutyronitrile) (AIBN), and 2,2'-azobis(dimethylvaleronitrile) (AMVN).

17. The composition for a gel polymer electrolyte of claim 1, further comprising a multifunctional (meth)acrylate-based compound having at least one acrylate group.

18. The composition for a gel polymer electrolyte of claim 1, wherein the organic solvent comprises ether-based solvent, an ester-based solvent, or an amide-based solvent or a mixture thereof.

* * * * *